United States Patent [19]

Bergna et al.

[11] Patent Number: 5,011,804
[45] Date of Patent: Apr. 30, 1991

[54] CERAMIC DIELECTRIC COMPOSITIONS AND METHOD FOR IMPROVING SINTERABILITY

[75] Inventors: Horacio E. Bergna, Wilmington; Ian Burn, Hockessin, both of Del.

[73] Assignee: E. I. Du Pont de Nemours and Company, Wilmington, Del.

[21] Appl. No.: 506,964

[22] Filed: Feb. 28, 1990

[51] Int. Cl.$^5$ .............................................. C04B 35/46
[52] U.S. Cl. ................................... 501/138; 501/139; 501/137; 501/154
[58] Field of Search ............... 501/134, 135, 136, 137, 501/138, 139, 154

[56] References Cited

U.S. PATENT DOCUMENTS

| | | | |
|---|---|---|---|
| 4,640,905 | 2/1987 | Burn | 501/137 |
| 4,845,062 | 7/1989 | Burn | 501/136 |
| 4,855,266 | 8/1989 | Burn | 501/138 |
| 4,879,261 | 11/1989 | Burn | 501/32 |
| 4,898,844 | 2/1990 | Maher et al. | 501/138 |

*Primary Examiner*—William R. Dixon, Jr.
*Assistant Examiner*—Chris Gallo

[57] ABSTRACT

An improved ceramic dielectric composition for preparing multilayer ceramic structures for electronic devices and a method of enhancing the sinterability of such compositions at low firing temperatures by improving the distribution of zinc borate based sintering flux uniformly throughout the composition.

13 Claims, No Drawings

CERAMIC DIELECTRIC COMPOSITIONS AND METHOD FOR IMPROVING SINTERABILITY

BACKGROUND OF THE INVENTION

The present invention relates to an improved ceramic composition for preparing multilayer ceramic structures for electronic devices, and, more particularly, to a method of enhancing, i.e., improving, the sinterability of such compositions at low firing temperatures by improving the distribution of sintering flux, and especially zinc borate based flux, uniformly throughout the composition.

Multilayer ceramic capacitors (MLC's) are the most widely used form of ceramic capacitors because of their high volumetric efficiency and their small size. These capacitors are typically manufactured by co-firing, i.e., sintering a ceramic dielectric formulation and a conductive electrode material in an oxidizing atmosphere at a temperature in the range of about 1200° to 1400° C. Firing under these conditions, however, requires an electrode material with high melting point, good oxidation resistance at elevated temperatures, sinterability at the maturing temperature of the dielectric, and minimal tendency to interact with the dielectric at the sintering temperature. These requirements normally limit the choice of electrode materials to the noble metals platinum and palladium or to alloys of platinum, palladium or gold.

The ceramic formulation must sinter to a dense hermetic body at a temperature below the melting point of the conductor co-fired with the ceramic in the multilayer structure, e.g., below about 1150° C. for a 70% Ag/30% Pd alloy and below 1083° C. for Cu. In the case of copper, the structure must also be fired in a non-oxidizing atmosphere to protect the conductors from oxidation during the sintering process. To achieve a dense hermetic structure when sintering at temperatures below 1150° C., fluxes can be added to the ceramic dielectric formulations. U.S. Pat. No. 4,640,905, for example, describes a manganese doped zinc borate flux, and a low firing ceramic based on barium titanate with a high dielectric constant (K) for use in MLC's with Ag/Pd conductors.

USSR Patent 692,810 describes the presence of 3 to 5 wt % of zinc borate in a barium titanate based ceramic sintered "cake" used to manufacture high frequency capacitors at a low sintering temperature. The capacitors are made by pressure forming and firing at 1020° to 1080° C. in an oxidising atmosphere.

U.S. Pat. No. 4,845,062 describes a zinc borate frit used as a sintering aid for a magnesium titanate based ceramic in MLC's with copper conductors.

U.S. Pat. No. 4,879,261 describes a low dielectric constant composition based on silicon dioxide with zinc borate frits used for making multilayer substrates with copper conductors. The substrates can be used for mounting active electronic components such as integrated circuits.

Glass compositions in which zinc borate is a component in admixtures of numerous metal oxides are documented in the prior art, however, coating ceramic particles prior to being sintered to form monolithic electronic components is not revealed.

U.S. Pat. No. 4,610,968 and U.S. Pat. No. 4,610,971 describe a ceramic dielectric composition capable of being sintered at a sufficiently low temperature to enable the use of a low cost base metal as the electrode material in the fabrication of capacitors. The dielectric composition is made by a ball milling process described in U.S. Pat. No. 4,626,396.

The addition of fluxes to ceramic powders has a tendency to degrade the dielectric properties of the sintered dielectric, e.g., producing a lower K, lower mechanical strength and a higher than desired dissipation factor. Thus, submicron ceramic powders are used to increase sinterability and allow for minimal amounts of fluxing additives. The particle size of the flux should be very small, i.e., smaller than the size of the ceramic powder. For advanced dielectric formulations, the ceramic powder particle size may be substantially below 1 micron, requiring a flux particle size of a few tenths of a micron. In general, it is difficult to prepare powders of the flux composition in which the particle size is significantly below one micron. This is due to the difficulty of milling glassy materials to yield submicron particles and the tendency of such particles to agglomerate into larger particles. Thus, fluxes described in the prior art tend to have a particle size of about one micron or larger. Even if fluxes could be prepared with smaller particle size, it may be impossible to achieve uniform distribution of the flux particles among the particles of the ceramic powder because of a tendency of very fine particles to flocculate in suspensions with polymer and solvent.

The difficulty of achieving a uniform distribution of the flux in low firing dielectric compositions has been overcome by the present invention in which the ceramic particles are coated with flux by special deposition techniques, and the coating methods can be applied generally to a variety of ceramic powders without excessive removal of ions from the surface of the powder particles during the coating process.

SUMMARY OF THE INVENTION

The invention relates to an improved low-firing ceramic powder composition and to a method of enhancing the sinterability of such compositions at low firing temperatures by improving the distribution of sintering flux, and especially zinc borate based flux, throughout the composition by coating the surface of ceramic powder particles uniformly with the flux according to the steps of:

(a) mixing sintering flux component precursors with the ceramic powder whereby the flux component precursors form a uniform coating on each particle; and (b) drying and optionally calcining the coated particles.

One coating method for carrying out the invention is blending below the liquid limit of the powder which comprises distributing the sintering flux uniformly on the surface of the ceramic powder particles by:

(a) adding a concentrated solution of at least one boron and one zinc flux component precursor to the ceramic powder while maintaining the pH at a predetermined range to prevent the dissolution of ions from the surface of the ceramic powder particles;

(b) vigorously stirring the mixture below the liquid limit of the powder to uniformly coat the particles with the flux component precursors; and (c) drying and optionally calcining the uniformly coated particles.

The liquid limit refers to the water content, in weight percent, of a powder comprising ceramic particles at an arbitrarily defined boundary between the liquid and plastic states. The ASTM Standard D4318-84 describes in greater detail the standard test method for liquid limit in reference to soils, and the teachings of which are incorporated herein with reference to powders.

A second coating method for carrying out the invention is surface hydrolysis which comprises distributing the sintering flux uniformly on the surface of the ceramic powder particles by:

(a) dispersing a hydroxylated ceramic powder in a solution of at least one zinc and one boron flux component hydrolyzable precursor in a water immiscible organic solvent;

(b) separating by filtration, centrifugation or decantation and washing the particles; and (c) drying and optionally calcining the uniformly coated particles.

A third coating method for carrying out the invention is surface nucleation which comprises distributing the sintering flux uniformly on the surface of the ceramic powder particles by:

(a) dispersing the ceramic powder in water;

(b) adding at a controlled rate either simultaneously or sequentially an aqueous solution of at least one zinc and one boron flux component precursor to the aqueous dispersion while maintaining the pH of the dispersion in the range of from 6.5 to 7.5 and the temperature in the range from 50° to 70° C.;

(c) recovering the ceramic powder particles; and (d) drying and optionally calcining the uniformly coated particles.

The ceramic dielectric composition which results from the process of this invention is substantially improved and comprises particles of ceramic oxides, each particle having a uniform but not necessarily continuous coating of a sintering flux comprising primarily zinc borate in an amount which is less than about 50% by weight of the powder and has a molar ratio of ZnO to $B_2O_3$ of from $\frac{1}{2}$ to 5/1.

The invention is further directed to forming a densified ceramic dielectric at low firing temperatures. The improved dielectric ceramic powder composition can be fired at temperatures from as low as 750° C. up to 1150° C. to effect sintering of the particles and densification of the composition. The improved ceramic dielectric composition is useful in the downstream processing of multilayer ceramic structures as described in greater detail in U.S. Pat. No. 4,640,905, the teachings of which are incorporated herein by reference and which steps include first forming a tape casting composition by casting a dispersion of the unsintered coated dielectric powder made by any of the coating methods described above, mixed optionally with uncoated ceramic particles, in a solution of binder polymer and a volatile solvent. Second, green tapes are made by placing a thin layer of the tape casting composition on a flexible substrate, such as a steel belt or polymeric film, and heating the cast layer to remove the volatile solvent therefrom. Thus, durable, well sintered multilayer devices which exhibit improved electrical performance are fabricated by:

(a) applying a layer of a conductive electrode material dispersed in an organic medium to each of a plurality of layers of green tape;

(b) laminating a plurality of the electrode-layered green tape to form an assemblage of alternating layers of green tape and electrode material; and (c) firing the assemblage at 750° to 1150° C. to remove the organic medium and organic binder therefrom and to sinter the conductive electrode material and dielectric.

Another method for fabricating MLC's involves forming a thick film paste by dispersing the unsintered coated dielectric powder prepared by any of the coating methods described above, mixed optionally with uncoated particles, in a volatile solvent. By using screen printing techniques, a dielectric and metal layer structure is designed. An assemblage, which includes the dielectric and metal layer structure and a second electrode layer, is co-fired.

DETAILED DESCRIPTION OF THE INVENTION

The ceramic dielectric powder to which this invention applies has an average particle size from 0.10 microns up to 5 microns. Best results are observed when the particle size of the unsintered powder ranges from about 0.2 to 1.5 microns. When the average particle size is below 0.1 micron, dispersion of the particles can become a problem because of the tendency of such particles to agglomerate making it difficult ultimately to obtain uniformly dense ceramic dielectric bodies having the desired dielectric properties. Suitable ceramic powders particles, i.e., substrates for the composition of the invention have a wide range of surface areas and K values. The ceramic powder, with high K values in excess of 12, comprises ceramic oxides selected from the titanates of Mg, Ba, Pb and mixtures thereof, particularly barium titanate and lead titanate based compositions. It is understood in the art that the titanates, for example barium titanate, may contain within the crystal structure or within the particle, certain other metal oxides such as the oxides of zirconium, neodymium, niobium and zinc. The ceramic powder, with low K values of 12 or less, comprises ceramic oxides selected from silica, silicates, and mixtures thereof, e.g., cordierite, mullite and anorthite.

In practicing the invention the ceramic powder particles are coated with a thin layer of a sintering flux which is based primarily on zinc borate. The term "primarily" is used herein to indicate that in accordance with glass making practice, up to 33 mole % of the $B_2O_3$ can be replaced by $SiO_2$, $GeO_2$, $Al_2O_3$ or mixtures thereof, and up to 33 mole % of ZnO can be replaced with alkaline earth metals or mixtures thereof. The molar ratio of $ZnO/B_2O_3$ is in the range of $\frac{1}{2}$ to 5/1, and typically 2/1 to 3/1 for coating high K substrates and 0.65/1 to 3/1 for coating low K substrates.

In view of the tendency of fluxes to degrade the dielectric properties of a sintered dielectric, it is preferred to achieve the desired low temperature sintering properties by using the least amount of flux component. Depending upon the nature of the substrate and the desired sintering characteristics, the flux component may comprise from about 0.1 to 50 wt. % of the coated powder. For high k powders, best results are achieved when the flux component is present in amounts of from about 0.15 to 3 wt. %. The desired level of flux in a densified ceramic dielectric may be obtained by blending together in appropriate proportions uncoated and coated powder particles having a known amount of flux coating and sintering the resulting mixture. The flux coating should not be thicker than is needed to give coated particles that can be sintered at a temperature below the melting point of the metallic conductor component and produce a ceramic dielectric having a dense hermetic structure. The surface area of the coated composition is similar to the surface area of the substrate prior to applying the thin flux coating.

A method for distributing a sintering flux uniformly on ceramic powder particles has been developed according to the invention, which is capable of applying a flux coating to a variety of ceramic particles without significant removal of ions from the surface of the particles. Ion removal usually occurs by aqueous dissolution, and it is undesirable because the dielectric properties of many ceramic dielectrics, e.g., barium titanate, require that a precise stoichiometry be preserved. The process of distributing a sintering flux uniformly on the surface of ceramic powder particles comprise the steps of:

(a) mixing sintering flux component precursors with the ceramic powder whereby the flux component precursors form a uniform coating on each particle; and (b) drying and optionally calcining the coated particles.

The following coating methods are designed to carry out the invention while minimizing aqueous extraction of ions from the particulate ceramic substrates.

A first method for coating particles of ceramic powders, i.e., blending below the liquid limit of the powder, is based on the addition of concentrated solutions of boron and zinc precursors and, optionally, precursors of other components, M, where M can be Si, Ge, Al, alkaline earth metals and mixtures thereof, to a ceramic powder at a slow rate while vigorously stirring, i.e., agitating, so that uniform distribution of the flux on the surface of particles can be achieved before the vehicle solvent, i.e., water, of the precursors used in forming the solution evaporates. By proper control of the addition rate the addition can be completed without ever reaching the liquid limit of the powder, thus insuring that a minimum of vehicle solvent has been used. Liquid limit is defined as the water content, in weight percent, of a powder comprising ceramic particles at an arbitrarily defined boundary between the liquid and plastic states. The ASTM Standard D4318-84 describes in greater detail the standard test method for liquid limit in reference to soils, and the teachings of which are incorporated herein with reference to powders. In the case of water as a solvent and a dielectric ceramic powder, such as barium titanate, for example, it is essential to keep the amount of water in contact with the powder at a minimum at all times to prevent partial dissolution of ions from the powder particles with consequent disproportionation of the substrate.

Preferred precursors useful in this coating process are highly water-soluble salts which decompose below 600° C. to volatile species and non-volatile flux components. Zinc nitrate, for example, decomposes at about 500° C. and gives a zinc oxide residue. The more soluble the salt is, the less water need be added to the powder. Other zinc sources include zinc acetate, zinc formate and zinc chloride. Zinc chloride, however, may adversely effect the ceramic dielectric properties caused by residual chloride. Precursors for boron include ammonium borate and water soluble boric acids. Ammonium borate yields nitrogen oxide vapors and boric oxide residue by thermal decomposition. Boric acids decompose at low temperatures to boric oxide.

Uniform distribution of zinc and boron precursors on the ceramic particle surface can be achieved by gradually adding a solution of the precursor to the vigorously agitated, i.e., stirred, ceramic powder. Vigorous stirring prevents the agglomeration of powder particles in the solution. Commercial mixers of various types, for example, V-blenders, vertical screw and ribbon blenders, and commercial food processors such as a Robot-coupe Model R-2 can be used to achieve adequate agitation.

In a typical example, using the Robot-coupe Model R-2, the bowl is loaded with a specified amount of powder and purged with dry air or nitrogen. The bowl is covered, maintaining a dry air or nitrogen atmosphere, while stirring at high speed, and a concentrated solution of the boron precursor optionally mixed with precursors of other components, M, where M is Si, Ge, Al or mixtures thereof, is added at a controlled rate, so that the water content of the powder is kept below the liquid limit. In this way the solution never "floods" the bowl, and the boron precursor is distributed uniformly on the surface of the particles. As the vehicle solvent evaporates, more solution is added gradually to the bowl, thus increasing the amount of precursor on the surface of the particles. An excessively fast rate of addition or insufficient agitation will cause flooding, and the solution will tend to dry away from the surface of the particles, i.e., causing the precursor to be non-uniformly distributed in the ceramic powder.

Once the addition of the boron precursor is complete the operation is repeated using the zinc precursor, optionally mixed with the precursors of other components, M, where M is Ca, Ba, Sr, Mg or mixtures thereof.

The pH should be adjusted at a predetermined range depending on the nature of substrate used, and maintained in this range during the addition of precursor solutions. It has been observed that maintaining the pH prevents the excess removal of ions from the surface of powder particles. It is desirable to adjust and maintain the pH to fall between 8.5 and 9.0 in the case of barium titanate, for example. During these operations the pH of the liquid film around the particle surface may be changed to an undesirable level. For example, the addition of acidic zinc nitrate solution to barium titanate may lower the pH and cause some barium to dissolve. To keep the pH at the desired level drops of concentrated ammonia are added until the optimum pH level is restored. If the pH is caused to rise to undesirable levels by the addition of precursor solution, the optimum pH can be restored by the addition of drops of acid.

Once the admixture of precursors is completed the powder is kept stirring, usually under flowing dry air or nitrogen, to accelerate the evaporation of residual water. At this stage, powder samples can be taken from different parts of the bowl and analyzed to ascertain that the water and precursor species have been uniformly distributed.

The amount of water in the samples is determined by drying a known amount of sample in a vacuum oven to constant weight. An elemental analysis is obtained by atomic emission spectroscopy (AES), using an Inductively Coupled Plasma Analyzer (ICP).

A powder sample which has been removed from the mixing bowl and dried is then analyzed to determine whether the flux component precursors have been uniformly distributed on the surface of the ceramic particles. The surface of the coated ceramic particles is analyzed by standard techniques, such as X-ray photoelectric spectroscopy (XPS or ESCA), secondary ion mass spectroscopy (SIMS) and ion scattering spectroscopy (ISS). These methods are sensitive to only a thin peripheral layer of the particles and therefore constitute an analysis of the surface and not the bulk of the particle. The other components of the precursors as, for example, $NH_4+$ in the case of ammonium tetraborate and $NO_3$ in the case of zinc nitrate, are decomposed, and volatilized by heating the sample at 400° to 600° C. for one or two hours in air, to yield the desired flux composition as a uniform coating on the powder particles.

The product obtained is a dry ceramic powder with $ZnO/B_2O_3$ or $ZnO/MO/B_2O_3$ in the desired molar ratio uniformly distributed on the surface of the ceramic particles.

A second method for coating particles of ceramic powders, i.e., surface hydrolysis, is based on selective hydrolysis of zinc and boron alkyls or alkoxide precursors and, optionally, other component precursors, M, where M can be Si, Ge, Al, alkaline earth metals or mixtures thereof, on the surface of the ceramic powder particles. The ceramic powder is dispersed in an organic solvent not soluble in water in which the anhydrous component precursors are dissolved. The ceramic powder particle surface is usually hydroxylated, and, therefore, hydrolysis of the component precursors takes place on the surface of the ceramic particles.

When the surface of the ceramic particles is not sufficiently hydroxylated, i.e., the number of hydroxyl groups on the surface is not enough to quantitatively hydrolyze the desired amount of component precursors added, the ceramic particles are pre-treated with water. To accomplish this before slurrying the powder in organic solvent an amount of water calculated to hydrolyze the desired amount of component precursors is added in the form of a uniform layer on the surface of the particles. Uniform distribution of water on the surface of ceramic particles can be obtained, for example, by exposing the dry particles to a water vapor atmosphere until the desired amount of water is adsorbed on the surface of the particles. Another way of uniformly covering the surface of the particles with a predetermined amount of water is by stirring the dry powder in a blender, adding water slowing and quickly confining the water treated powder when the addition is complete to prevent water evaporation. Alternatively, dry particles can be treated with water by fluidizing the powder and exposing it to water vapor. Any method that results in the formation of a uniform layer of water on the surface of the ceramic powder particles can be used to achieve the purpose of this invention.

Once the ceramic powder is known to contain sufficient hydroxyl groups or water uniformly coating the particles, it can be slurried in the solution of component precursors in an organic solvent which is insoluble in water. Since hydrolysis occurs by reaction of the anhydrous precursors with hydroxyl groups or water, and the hydroxyl groups or water are present on the surface of the ceramic particles, and are not present in the bulk of the organic solvent, decomposition of the component precursors takes place on the surface of the particles. Enough contact time is allowed for the component precursors to hydrolyze and when hydrolysis is complete the ceramic particles are separated by filtration, centrifugation or decantation from the organic solvent and washed with the solvent to eliminate residual by-products, e.g., low boiling point alcohols and water, of hydrolysis. The powders are then dried in an air or vacuum oven and treated thermally to decompose the precursors and form $ZnO/B_2O_3$ or $ZnO/MO/B_2O_3$ coatings on the particle surface. Calcining the coated particles for 1 to 2 hours at a temperature in the range of 400° to 600° C. is optional.

A third method for coating the particles of ceramic powders, i.e., surface nucleation, is based on dispersing in water and aqueous solution zinc and boron and, optionally, other component precursors are added either simultaneously or sequentially, i.e., in a pre-determined sequence at a controlled rate, constant temperature, i.e., in range 50° to 70° C. and pH in the range of 6.5 to 7.5. Similar precursors in the blending below the liquid limit method are useful in the surface nucleation method. Optimum pH and temperature are established to promote nucleation of precursors of zinc and boron and any other species, M, where M can be Si, Ge, Al, alkaline earth metals or mixtures thereof, which may be present on the surface of the ceramic particles. The factors involved in this method are type of precursors, concentration, rate of addition of the precursors; specific surface area and nature of the surface of the ceramic particles; and the concentration, temperature and pH of the aqueous slurry. This method is most suitable for ceramic substrate powders that are not affected by water, for example, silicates. It can be used, but is not preferred, in the case of substrates that are susceptible to dissolution of ionic components, for example, barium titanate. It is important that any substrate ions which are dissolved by water remain in the system. One way to accomplish this is to recover the treated ceramic particles by evaporation of the aqueous phase, for example, by freeze or spray drying, which will preserve the critical stoichiometry of the ceramic dielectric. A final calcining step at a temperature in the range of 400° to 600° C. for 1 to 2 hours is optional.

Finally, a vapor phase coating method may also be used with satisfactory results. In this method, organo compounds of zinc and boron and optionally other flux components, M, where M can be Si, Ge, Al, alkaline earth metals or mixtures thereof are volatilized and brought into contact with a heated bed of the ceramic dielectric particles. Alkyls or alkoxides are suitable organo compounds. The particle bed is heated to a temperature in the range of from 400° to 600° C. and the organo precursors are decomposed and react to form a surface coating of the flux on the particles.

The dielectric ceramic powder composition which results from the process of the invention is substantially improved and comprises particles of ceramic oxides, each having a uniform coating of a sintering flux comprising primarily zinc borate in an amount which is less than 50% by weight of the powder and has a molar ratio of ZnO to $B_2O_3$ of from $\frac{1}{5}$ to 5/1. The invention is further directed to forming a densified ceramic dielectric at low firing temperatures. The improved dielectric ceramic powder composition can be fired at temperatures from as low as 750° C. up to 1150° C. to effect sintering of the particles and densification of the composition. Durable, well sintered multilayer devices which exhibit improved electrical performance are fabricated using the improved ceramic powder composition, i.e., the composition made by the process of this invention is used in downstream processing of multilayer components according to the steps of:

(a) mixing sintering flux component precursors with the ceramic powder whereby flux precursors form a uniform coating on each particle; and (b) drying and optionally calcining the coated particles;

(c) casting a dispersion of coated particles of ceramic powder mixed optionally with uncoated ceramic particles of ceramic powder in a solution of binder polymer and a volatile solvent to form a tape casting composition;

(d) placing a thin layer of the tape casting composition on a flexible substrate and heating the cast layer to remove the volatile solvent therefrom to form a green tape;

(e) applying a layer of conductive electrode material dispersed in an organic medium to each of a plurality of layers of green tape;

(f) laminating a plurality of the electrode-layered green tape to form an assemblage of alternating layers of green tape and electrode material; and (g) firing the assemblage at 750° to 1150° C. to remove the organic medium and organic binder therefrom and to sinter the conductive electrode material and dielectric.

Another method for fabricating MLC's involves forming a thick film paste by dispersing the unsintered coated dielectric powder particles made by any of the coating methods described above, mixed optionally with uncoated particles, in a volatile solvent. By using screen printing techniques, as described in greater detail in U.S. Pat. No. 4,640,905, the teachings of which are incorporated herein by reference, a dielectric and metal layer structure is designed. An assemblage, which includes the dielectric and metal layer structure and a second electrode layer, is co-fire. The following examples serve to illustrate the invention, but are not intended to limit the scope of the invention.

EXAMPLE 1

This example illustrates the preparation of a zinc borate coated barium titanate powder composition by the surface hydrolysis method and its evaluation as a low firing temperature dielectric ceramic in a MLC.

A toluene solution of DEZ(11.2% diethyl zinc in toluene, obtained from Texas Alkyls, Inc.) and TEB,(-triethyl borate obtained from Aldrich Chemical Co. Cat. No. T5,930-7) was prepared in a dry nitrogen atmosphere in a glove box. 17.017 g of DEZ was weighed into a 50 mL beaker and diluted with toluene to give 50 mL of solution which was transferred to a one liter graduated cylinder containing 400 mL of toluene. The beaker was rinsed three times with 50 mL (150 mL total) of toluene, and this was added to the cylinder. 1.936 g of TEB was weighed into a 50 mL beaker and dissolved in toluene to give 50 mL of solution which was also added to the cylinder. The beaker was rinsed three times with 50 mL (150 mL total) of toluene, which was added to the cylinder. The volume of the solution in the cylinder was made up to 1000 mL with toluene, and, after mixing thoroughly by stirring, the solution was poured into a half gallon narrow neck bottle. An additional 100 mL of toluene was added and the bottle was sealed and shaken to ensure that the solution was uniform. 100 mL of the solution was then removed for analysis.

Based on the results of the analyses the remaining one liter of solution was found to contain the equivalent of 1.58 g ZnO and 0.42 g $B_2O_3$ corresponding to a nominal solution of 0.1% ZnO/$B_2O_3$ with a molar ratio of 3.2/1. This solution was then stored in a sealed bottle in a dry box.

The barium titanate used in this example was obtained from Fuji Titanium, Japan. It was designated "jet milled HPBT-1, lot 50904". Electron microscopy showed that it consisted of polydisperse, submicron irregular particles. The average particle size by Sedigraph was 0.72 microns and the BET surface area was 24 $m^2$/cc. The A/B ratio was 0.998, the carbon content 0.16% and the isoelectric point, by zeta potential measurement, was 4.2.

200 g of the above barium titanate powder was dried in a vacuum oven at 110° C. for 16 hours. It was then transferred to a Robot-coupe Model R-2 commercial food processor, and, with the processor running, 2 mL of water was slowly added. In order to ascertain the uniformity of water distribution throughout the powder, five small random samples of the powder were taken, weighed and then dried by heating at 110° C. in a vacuum oven for 16 hours. The weight loss was then determined and expressed as a percentage of the sample. The average weight loss was found to be 0.54%, and the range within the group of samples was +0.14%, which indicated that the water was well distributed over the surface of the powder particles. The hydrated powder was then placed in a half gallon wide mouth bottle and stored in the dry box.

The previously prepared one liter solution of DEZ/TEB was poured into the bottle containing the barium titanate. The bottle was sealed and tumbled end over end for 16 hours to ensure that the contents were thoroughly slurried. About 500 mL of the slurry was then evenly divided between three 200 mL centrifuge bottles and centrifuged using a Sorvall centrifuge at 4000 rpm to separate the solids. The supernatent was analyzed and found to contain the equivalent of 0.000% ZnO and 0.062% $B_2O_3$. The product was found to have a Ba/Ti ratio of 0.996, and the coating was equivalent to 0.660% ZnO and 0.195% $B_2O_3$ corresponding to a ZnO/$B_2O_3$ molar ratio of 2.9/1.

The coated powder was then calcined at 400° C. for two hours to remove residual organics and then blended with conventional barium titanate modifiers: 12.5% lead zirconate, 4.26% barium zinc niobate, and 0.14% manganese carbonate to produce a 50.0 g batch. The blending was accomplished by ball milling for 5 hours in a 000 size mill using 33.0 g of binder mix. The binder mix consisted of 28.3% Du Pont 5200 Acrylic Binder (a 30% solution of resin in methyl ethyl ketone MEK), 2.0% plasticizer (butyl benzyl phthalate), 1.5% of Polypale (Hercules, Inc.) solution in isopropyl alcohol, and 68.2% of 1,1,1-trichloroethane solvent. An extra 3.0 g of solvent was added and then the suspension was cast onto a polypropylene carrier, using a standard doctor-blade technique for forming a green tape. The tape when dried was 25 microns thick. It was removed from the carrier, cut into sections, and then electrode patterns were screen printed onto it using a multilayer capacitor electrode paste of 70% Ag-30% Pd metal, (e.g. Du Pont 4803D). Multilayers were laminated with five active dielectric layers (6 electrodes) with eight cover layers on the bottom, and on the top, to add strength. The laminates were then cut into individual capacitors, (Electrical Industries Association standard 1209 size).

The new multilayer capacitors were then heated slowly to 750° C. to remove the organic binder. Then they were fired at 1100° C. for 2.5 hours to sinter the ceramic into a dense, monolithic structure. Electrode terminations were applied by coating the ends of the capacitors with termination paste (Du Pont 4506) and firing at 750° C. for 15 minutes. After aging for 24 hours the capacitors were ready for testing. Excellent electrical results were obtained. Average dielectric constant was 10,500, dissipation factor was 1.8% measured with 1 volt, and insulation resistance exceeded 100,000 ohm. farads, a very high value. Polished sections of the capacitors confirmed a very dense microstructure with each layer having a dielectric thickness of 21 microns.

TABLE 1

Zinc Borate Coatings by Surface Hydrolysis

| Example No. | Substrate Type | Amount (g) | $H_2O$ (g) | $ZnO/B_2O_3$ % | Precursors(a) Molar Ratio | $ZnO/B_2O_3$ % | Coating Molar Ratio | Product Recovered (g) |
|---|---|---|---|---|---|---|---|---|
| 4 | $BaTiO_3$(b) | 250 | 8.11 | 4.5 | 2.5/1 | 3.92 | 2.5/1 | 261 |
| 5 | $SiO_2$(c) | 110 | 1.1 | 1.0 | 3.0/1 | 0.94 | 2.8/1 | 48 |
| 6 | $SiO_2$(c) | 110 | 1.1 | 5.0 | 3.0/1 | 3.85 | 3.89/1 | 50.1 |
| 7 | PL802(d) | 650 | 9.76 | 2.5 | 2.5/1 | 1.44 | 2.9/1 | 608 |

(a)Precursor solutions in toluene
(b)Same source as that used in Example 1
(c)$SiO_2$ microspheres prepared by hydrolysis of tetraethyl orthosilicate (TEOS). Dense spheres of uniform diameter, 450–475 nanometers. Volume coalescence = 2.9%
(d) Du Pont PL 802 is a combination of lead titanate and lead magnesium tungstate

EXAMPLE 2

The procedure of Example 1 was followed using lead titanate/lead magnesium titanate powder (PL 802, a commercial dielectric obtained from Du Pont) in place of the barium titanate used in Example 1. The product power was analyzed to have a coating of 3.2% zinc borate at a zinc to boron ratio of 4.27/1.

Green tape was made by blending 100.0 g of coated powder with 66.0 g of binder mix, using the procedure described in Example 1. Multilayer capacitors were then made as described in Example 1. These were fired at a temperature 850° C. for 2.5 hours, after which the capacitors were dense and had a dielectric constant close to 2000, a dissipation factor of 3.3%, and an insulation resistance of 10,000 ohm. farads. The dielectric thickness was 18 microns.

EXAMPLE 3

The barium titanate used in this example was an experimental high purity barium titanate having an A/B ratio of 0.994. The BET surface area was 54 $m^2/cc$ and the average particle size, by Microtrac analysis was 410 nanometers. This powder was used in place of the barium titanate in Example 1, but the procedure followed was the same. The coated powder was analyzed, and the coating comprised 0.88% zinc borate having a zinc to boron ratio of 2.42/1.

The coated powder was then heated at 400° C. for 2 hours to remove residual organics. 41.63 parts of this lightly calcined powder, 6.25 parts lead zirconate, 2.13 parts barium zinc niobate and 0.075 parts manganese carbonate were blended together and tape and multilayer capacitors were made as described in Example 1. The sintered capacitors were dense and had a dielectric constant in the range of about 9,500 to 11,400, a dissipation factor of 1.6% and an insulation resistance greater than 20,000 ohm. farads. The micrography of polished sections of the capacitors confirmed that each had a dense uniform grain structure with each layer having a dielectric thickness of 23 microns.

EXAMPLES 4–7

The products of these examples were all made by the surface hydrolysis method for zinc borate coatings. The procedure followed was that described in Example 1. The substrates used, the amount of water added to achieve surface hydrolysis of the substrates, the compositions of the toluene precursor solutions and the compositions of the coated powders are given in Table 1.

EXAMPLE 8

This example describes the preparation of zinc borate coated barium titanate by blending below the liquid limit.

A solution of ammonium tetraborate (ATB) containing the equivalent of 4.036% $B_2O_3$ was prepared by dissolving 44 g of $(NH_4)_2B_4O_7.4H_2O$, supplied by Pfaltze Bauer, in 500 mL of deionized water, adjusting the pH to 9.0 with 14.5% ammonium hydroxide and the final volume to 600 mL with deionized water.

A solution of zinc nitrate (ZNO) containing the equivalent of 7.555% ZnO was prepared by dissolving 170.7 g of $Zn(NO_3)_2.6H_2O$, a Reagent Grade supplied by J. T. Baker, in 500 mL of deionized water and adjusting the final volume to 600 mL with deionized water.

The barium titanate powder used in Example 3 was heated for 2 hours in a vacuum oven at 110° C. to determine the weight loss due to removal of water. Three samples gave an average weight loss of 0.6587% so that 201.3 g of the powder contained 200 g of anhydrous barium titanate.

201.3 g of the barium titanate as received was loaded into a Robot-coupe Model R-2 commercial food processor. With the processor blade running at 1725 rpm, 11 mL of the previously prepared ATB solution was pumped into the food processor bowl at a rate of 6 mL/min. using a Masterflex (R) tubing pump. 20.2 mL of the previously prepared ZNO solution was then added using the same type of pump and the same feed rate. Three small samples (I) were removed during the addition, dried at 110° C. in a vacuum over for 16 hours and analyzed for zinc, as ZnO, and boron, as $B_2O_3$. The pH of the mix was adjusted to 8.5 by the addition of aqueous ammonia and the processor bowl was purged with nitrogen with the blade continuing to run at 1725 rpm until the powder appeared to be dry and was free flowing. Again three small samples (II) were removed, dried and analyzed as before.

The powder was discharged from the food processor bowl and dried at 110° C. in a vacuum oven for 16 hours. Three small samples were taken (III) for analysis. The food processor bowl was washed with 250 mL portions of deionized water. The combined washings were centrifuged to remove any solids and samples of the supernatant (IV) were analyzed.

Three 201.3 g samples of barium titanate powder were coated with zinc borate as described above. The analytical results, based on the average of the three samples in each case, obtained for the intermediate samples and the final products, identified as A, B, and C, are listed in Table 2.

TABLE 2

| | Analytical Results | | | | | |
|---|---|---|---|---|---|---|
| | A | | B | | C | |
| | % B$_2$O$_3$ | % ZnO | % B$_2$O$_3$ | % ZnO | % B$_2$O$_3$ | % ZnO |
| I | 0.205 | 0.665 | 0.197 | 0.725 | 0.170 | 0.765 |
| II | 0.210 | 0.652 | 0.197 | 0.690 | 0.200 | 0.723 |
| III | 0.210 | 0.645 | 0.200 | 0.665 | 0.190 | 0.705 |
| IV(a) | 0.001 | 0.002 | 0.002 | 0.001 | 0.001 | |
| ZnO/B$_2$O$_3$ in III | 2.63/1 | | 2.84/1 | | 3.17/1 | |

(a) Average of two for these samples

Only traces of ZnO and B$_2$O$_3$ were found in the wash supernatants, showing that essentially all the flux components remained on the barium titanate. The three samples A, B and C were combined and blended together to give a product having a coating comprising 0.671% ZnO and 0.200% B$_2$O$_3$ corresponding to a ZnO/B$_2$O$_3$ molar ratio of 2.87/1.

A sample of the blended product was used to prepare multilayer capacitors, as described in Example 1. The composition sintered readily at 1100° C. to a dense monolithic structure. The capacitors formed therefrom were found to have excellent electrical characteristics.

EXAMPLE 9

This example describes the preparation of zinc borate coated Du Pont PL 802, a dielectric composed mainly of lead titanate and lead magnesium tungstate, by blending below the liquid limit.

ATB and ZNO solutions, containing the equivalent of 5.48% B$_2$O$_3$ and 20.75% ZnO respectively, were prepared as described in Example 8.

To 500 g of Du Pont PL 802 powder in a commercial food processor, as used in Example 6, with the blade running at 1725 rpm was added 81.5 mL of the ATB solution at the rate of 6 mL/min. as described in Example 8. This was followed by 60 mL of ZNO solution at the same feed rate. The pH was adjusted to 8.5 by the addition of aqueous ammonia. Samples were taken at each stage of the process and analyzed as in Example 6. The product was dried under nitrogen and finally in a vacuum oven at 110° C. for 16 hours.

Analyses showed that essentially all the flux components remained on the PL 802 powder. The final product had a coating comprising 2.105% ZnO and 0.825% B$_2$O$_3$ corresponding to a ZnO/B$_2$O$_3$ molar ratio of 2.18/1.

EXAMPLE 10

This example describes the preparation of zinc borate coated barium titanate by means of the surface nucleation method.

ATB and ZNO solutions containing the equivalent of 0.333% B$_2$O$_3$ and 1.167% ZnO respectively were prepared as described in Example 8.

100 g of the barium titanate powder used in Example 1 together with 250 mL of deionized water was charged to a 2500 mL round bottom flask provided with a stirrer, an automatic pH controller and a heating mantle. The stirred slurry was heated to 60° C. and the pH was controlled to 7.0 using dilute nitric acid or ammonia. 100 mL of ATB solution was pumped in at 1.8 mL/min. using a metering pump. A small sample was removed and analyzed for boron as B$_2$O$_3$. 67.7 mL of ATB and 67.7 mL of ZNO solutions were then pumped in simultaneously at 1.0 mL/min., using identical monitoring pumps. When the addition was complete the stirred slurry was digested with stirring for one hour at 60° C. while the pH was maintained at 7.0. The slurry was then allowed to cool to room temperature.

The slurry was transferred to a Sorvall centrifuge and the solids separated at 4000 rpm. The solids were washed three times by re-slurrying in 100 mL of deionized water with the pH adjusted to 7.0 and re-centrifuged to separate the solids. The initial centrifuge supernatent and wash supernatent were analyzed.

The solids were dried in a vacuum oven at 110° C. for 16 hours and analyzed.

A sample of this product was used to prepare multilayer capacitors, as described in Example 1. The composition sintered readily at 1100° C. to a dense monolithic structures. The capacitors showed excellent electrical characteristics.

What is claimed is:

1. A method for enhancing the sinterability of ceramic dielectric composition comprising uniform coated particles of ceramic powder according to the steps of:
    (a) mixing sintering flux component precursors with the ceramic powder whereby the flux component precursors form a uniform coating comprising primarily zinc borate on each particle wherein said coating comprises less than about 50% by weight of the coated particle; and
    (b) drying and optionally calcining the coated particles.

2. The method of claim 1 wherein the ceramic powder comprises titanates of Mg, Ba, Pb or mixtures thereof.

3. The method of claim 1 wherein the ceramic powder comprises silica, silicates or mixtures thereof.

4. The method of claim 2 or claim 3 in which the sintering flux is distributed uniformly on the surface of ceramic powder particles by:
    (a) adding a concentrated solution of at least one boron and one zinc flux component precursor to the ceramic powder while maintaining the pH to prevent the dissolution of ions from the surface of the ceramic powder particles;
    (b) vigorously stirring the mixture below the liquid limit of the powder to uniformly coat the particles with the flux component precursors; and
    (c) drying and optionally calcining the coated particles.

5. The method of claim 4 wherein the zinc flux component precursor is selected from the group consisting essentially of zinc nitrate, zinc acetate, zinc formate, and zinc chloride, mixed optionally with precursors of Ca, Ba, Sr, Mg or mixtures thereof; and wherein the boron flux component precursor is selected from the group consisting essentially of ammonium borate, and water soluble boric acid, mixed optionally with precursors of Si, Ge, Al or mixtures thereof.

6. The method of claim 2 or claim 3 in which the sintering flux is distributed uniformly on the surface of ceramic powder particles by:
   (a) dispersing a hydroxylated ceramic powder in a solution of at least one zinc and one boron flux component precursors in a water immiscible organic solvent;
   (b) separating and washing the particles; and
   (c) drying and optionally calcining the coated particles.

7. The method of claim 6 wherein the precursors are selected from the group consisting essentially of zinc and boron alkyls or alkoxide precursors mixed optionally with precursors of Si, Ge, Al or mixtures thereof or Ca, Ba, Sr, Mg or mixtures thereof.

8. The method of claim 2 or claim 3 in which the sintering flux is distributed uniformly on the surface of ceramic powder particles by:
   (a) dispersing said ceramic powder in water;
   (b) adding at a controlled rate either simultaneously or sequentially an aqueous solution of at least one zinc and one boron flux component precursor while maintaining the pH of the dispersion in the range of from 6.5 to 7.5 and the temperature in the range of from 50° to 70° C.;
   (c) recovering the ceramic powder particles; and
   (d) drying and optionally calcining the coated particles.

9. The method of claim 8 wherein the zinc flux component precursor is selected from the group consisting essentially of zinc acetate, zinc formate, and zinc chloride, mixed optionally with precursors of Ca, Ba, Sr, Mg, or mixtures thereof; and wherein the boron flux component precursor is selected from the group consisting essentially of ammonium borate, and water soluble boric acid, mixed optionally with precursors of Si, Ge, Al or mixtures thereof.

10. An improved dielectric ceramic powder composition comprising particles of ceramic powder, each particle having a uniform coating of a sintering flux comprising primarily zinc borate which comprises less than 50% by weight of the powder and has a molar ratio of $ZnO$ to $B_2O_3$ of from $\frac{1}{2}$ to 5/1, and which is formed by the process of:
   (a) mixing sintering flux component precursors with the ceramic powder whereby the flux component precursors form a uniform coating on each particle; and
   (b) drying and optionally calcining the coated particles.

11. The improved dielectric ceramic powder composition of claim 10 which is coated by the process of:
   (a) uniformly dispersing a sintering flux comprising zinc borate on the surface of ceramic powder particles by adding a concentrated solution of at least one boron and one zinc flux component precursor to the ceramic powder composition while maintaining the pH of the dispersion in a predetermined range to prevent the dissolution of ions from the surface of the ceramic powder particles;
   (b) vigorously stirring the mixture below the liquid limit of the powder to coat the powder particles with the flux components;
   (c) drying and optionally calcining the coated particles.

12. The improved dielectric ceramic powder composition of claim 10 or claim 11 which is fired in the range of about 750° to 1150° C. to effect sintering of the particles and densification of the composition.

13. A sinterable dielectric ceramic composition having a uniform distribution of a zinc borate based sintering flux on the surface of particles of ceramic powder according to the steps of:
   (a) adding a concentrated solution of at least one boron and one zinc flux component precursor to the ceramic powder while maintaining the pH in a predetermined range to prevent the dissolution of ions from the surface of the ceramic powder particles;
   (b) vigorously stirring the mixture below the liquid limit of the powder to uniformly coat the particles with the flux component precursors; and
   (c) drying and optionally calcining the coated particles.

* * * * *